Patented Sept. 5, 1939

2,171,828

UNITED STATES PATENT OFFICE 2,171,828

PROCESS FOR THE MANUFACTURE OF CHROMIFEROUS AZO DYESTUFFS

Walter Hanhart, Riehen, near Basel, and Peter Pieth, Basel, Switzerland, assignors to the firm Society of Chemical Industry in Basle, Basel, Switzerland No Drawing. Application November 7, 1936, Serial No. 109,800. In Switzerland November 12, 1935

6 Claims. (Cl. 260—151)

It has been found that chromiferous azo-dyestuffs can be produced by heating azo-dyestuffs of the general formula

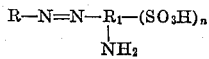

wherein R represents the radical of a diazo component containing groups capable of binding metal in complex union, $R_1$ represents a naphthalene nucleus, and $n$ the number 1, 2 or 3, and wherein the $NH_2$-group of the naphthalene nucleus $R_1$ stands in 1- and in ortho-position to the azo-group, with salts of the trivalent chromium derived from inorganic acids until on the one hand the complex chromium compound of the azo-dyestuff has been formed and, on the other hand, the $NH_2$-group of the naphthalene nucleus $R_1$ standing in ortho-position to the azo-group has been exchanged for a hydroxyl group.

The azo-dyestuffs serving as the parent materials of the process may be obtained by acid or neutral coupling of diazo-compounds of the benzene and naphthalene series containing groups capable of binding metal in complex union, that is to say, among others, diazo-compounds which contain in ortho-position to the diazo-group a hydroxyl-, carboxyl- or alkoxy-group, or contain a salicylic acid grouping, with amino-naphthalene sulfonic acids which may contain further substituents, for example hydroxyl-groups. Such amino-naphthalene-sulfonic acids are, for example, 1-aminonaphthalene-4:6-disulfonic acid, 1-aminonaphthalene-4:8-disulfonic acid, 1-aminonaphthalene-3:6-disulfonic acid, 1-amino-8-hydroxynaphthalene-4-sulfonic acid, 1-aminonaphthalene-4-sulfonic acid, 1-aminonaphthalene-5-sulfonic acid, 1-amino-8-hydroxynaphthalene-3:6-disulfonic acid, 1:8-diaminonaphthalene-3:6-disulfonic acid, 1-amino-8-hydroxynaphthalene-4:6-disulfonic acid and 1-aminonaphthalene-4:6:8-trisulfonic acid.

The operation of heating the azo-dyestuff with a salt of trivalent chromium until on the one hand the complex chromium compound of the azo-dyestuff has been formed and on the other hand the $NH_2$-group in the naphthalene nucleus $R_1$ in ortho-position to the azo-group has been replaced by hydroxyl, may be conducted in an open vessel or under pressure; the duration of the heating depends on the one hand on the dyestuff used and on the other hand on the chroming agent and its concentration in the reaction mixture.

As salts of trivalent chromium suitable for use in the invention there may be named, for example, the salts of hydrochloric acid, hydrofluoric acid and sulfuric acid.

The dyestuffs containing chromium obtainable by the present invention are suitable more particularly for dyeing animal fibers such as wool and silk; they dye these fibers various fast shades.

The following examples illustrate the invention:

Example 1

53.8 parts of the azo-dyestuff from diazotized 4-chloro-2-amino-1-hydroxybenzene-5-sulfonic acid and 1-aminonaphthalene-4:6-disulfonic acid of the formula

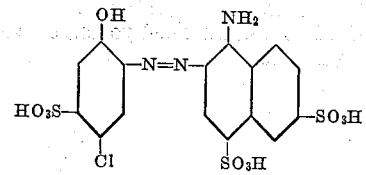

are dissolved in 500 parts of hot water and, after addition of an aqueous solution of chromium sulfate containing 11.4 parts of $Cr_2O_3$ and 22.8 parts of concentrated sulfuric acid, the mixture is boiled under reflux for about 12 hours. The dyestuff obtained by evaporating the solution is a dark powder which dissolves in water and dilute caustic soda solution to a reddish-violet solution and in concentrated sulfuric acid to a dirty red solution. It dyes wool in a bath containing sulfuric acid violet tints of good fastness to milling and light.

Example 2

46.8 parts of the azo-dyestuff from diazotized 5-nitro-2-amino-1-hydroxybenzene and 1-aminonaphthalene-4:8-disulfonic acid of the formula

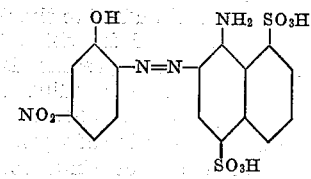

are dissolved in 1000 parts of water and after addition of an aqueous solution of chromium sulfate containing 9.4 parts of $Cr_2O_3$ and 18.4 parts of concentrated sulfuric acid, the mixture is boiled under reflux for 24 hours. The dyestuff is separated by addition of common salt; it is a dark powder which dissolves in water to a blue-violet solution and in dilute caustic soda solution to a violet solution, and in concentrated sulfuric acid to a brown-red solution. It dyes wool in a bath containing sulfuric acid greenish-blue tints of good fastness to light.

Example 3

51.9 parts of the azo-dyestuff made by coupling in acid solution diazotized 2-amino-1-hydroxybenzene-4:6-disulfonic acid and 1-amino-8-hydroxynaphthalene-4-sulfonic acid of the formula

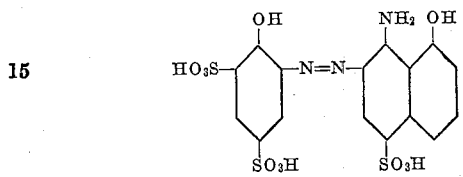

are dissolved in 3000 parts of water and after addition of an aqueous solution of chromium sulfate containing 11.4 parts of $Cr_2O_3$ and 27.8 parts of concentrated sulfuric acid, the mixture is boiled under reflux for 24 hours. The mineral acid is now in greater part neutralized by addition of sodium carbonate and the solution of the dyestuff, if desired after filtration, is evaporated. The dyestuff is a dark powder, soluble in water to a violet solution, in dilute caustic soda solution to a blue solution and in concentrated sulfuric acid to a dirty violet solution. It dyes wool in a bath containing sulfuric acid bluish-violet, fast tints.

Example 4

52.5 parts of the azo-dyestuff from diazotized 4-chloro-5-nitro-2-amino-1-hydroxybenzene and 1-aminonaphthalene-4:8-disulfonic acid of the formula

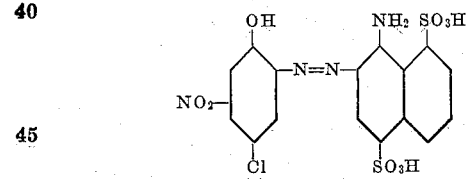

are dissolved in 1000 parts of water and the solution is heated for some hours with a chromium sulfate solution containing 9.5 parts of $Cr_2O_3$ at 125–130° C. The solution is then filtered from insoluble constituents and evaporated to dryness in a vacuum.

The dyestuff is a violet-black powder, soluble in water and in sodium carbonate solution of 10 per cent. strength and in caustic soda solution of 10 per cent. strength to blue-violet solutions and in concentrated sulfuric acid to a bordeaux red solution. It dyes wool pure blue tints.

The chromium compound which is obtained by a short chroming, by means of chromium formate, of the azo-dyestuff named in the first paragraph of this example and in which the $NH_2$-group in 1-position is still present, is a black powder, soluble in water and in sodium carbonate solution of 10 per cent. strength to a bluish-green solution and in caustic soda solution of 10 per cent. strength to a green-blue solution; in concentrated sulfuric acid to a violet-black solution. This chromium compound dyes wool bluish-green tints.

Example 5

98 parts of the azo-dyestuff from diazotized 5-nitro-2-amino-1-hydroxybenzene and 1-aminonaphthalene-4:6-disulfonic acid of the formula

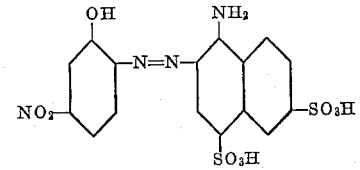

are dissolved in 2000 parts of water and the solution is heated with a normal chromium sulfate solution containing 19 parts of $Cr_2O_3$ at 125–130° C. until the color of the solution no longer changes. Evaporation to dryness in a vacuum follows.

The chromium compound is a black powder, soluble in water, in sodium carbonate solution of 10 per cent. strength, in caustic soda solution of 10 per cent. strength and in concentrated sulfuric acid to solutions which are violet, red and dichroic. It dyes wool blue, fast tints.

The chromium compound of the azo-dyestuff named in the first paragraph of this example, which is obtained by a short chroming by means of chromium formate, and still contains the $NH_2$-group in 1-position, dyes wool greenish-blue tints.

Example 6

42 parts of the azo-dyestuff from diazotized 5-nitro-2-amino-1-hydroxybenzene and 1-aminonaphthalene-4-sulfonic acid of the formula

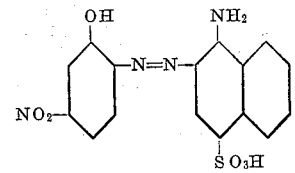

are dissolved in 1000 parts of water and the solution is heated with one of chromium sulfate containing 9.5 parts of $Cr_2O_3$ for 6 hours at 125–130° C. The chromium compound is salted out.

When dry it is a grey blue powder, soluble in water to a green blue, in sodium carbonate solution of 10 per cent. strength and in caustic soda solution of 10 per cent. strength to a blue solution, and in concentrated sulfuric acid to a greenish-black solution. It dyes wool blue tints.

Example 7

34.4 parts of a paste of hydrated chromium oxide containing 4.75 parts of $Cr_2O_3$ are dissolved with aid of heat in 9.45 parts of concentrated sulfuric acid and the solution is heated with one of 24 parts of the azo-dyestuff from diazotized 4-chloro-2-amino-1-phenol and 1-aminonaphthalene-4:7-disulfonic acid of the formula

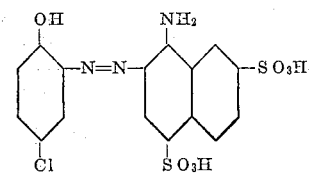

in 500 parts of water in a lead-lined autoclave for 6 hours at 125–130° C. The solution of dyestuff is then evaporated to dryness in a vacuum.

The dried chromium compound is a black powder, soluble in water and in sodium carbonate solution of 10 per cent. strength to a bluish-red solution and in caustic soda solution of 10 per cent. strength to a red solution, and in concentrated sulfuric acid to a bordeaux red solution. It dyes wool violet, fast tints.

Example 8

45.1 parts of the azo-dyestuff from diazotized 2-aminobenzene-1-carboxylic acid and 1-aminonaphthalene-4:8-disulfonic acid of the formula

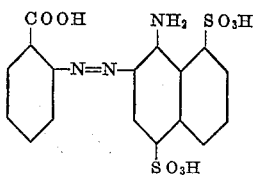

are dissolved in 750 parts of hot water, a solution of chromium sulfate containing 7.6 parts of chromium oxide ($Cr_2O_3$) and 14.7 parts of concentrated sulfuric acid is added and the whole is boiled for 24 hours in a reflux apparatus. The hot dyestuff solution is then freed from a small quantity of impurity by filtering and the dyestuff is precipitated by addition of common salt to the filtrate. When dry it is a brown-violet powder which dissolves in water and in concentrated sulfuric acid to bluish-red solutions and dyes wool in a sulfuric acid bath pure red-violet shades.

Example 9

47.1 parts of the azo-dyestuff from diazotized 1-methoxy-2-amino-4-chlorobenzene and 1-aminonaphthalene-4:8-disulfonic acid of the formula

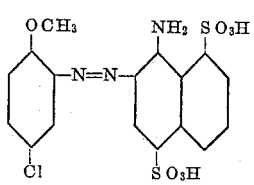

are dissolved in 1750 parts of hot water and heated at 125-130° C. in an autoclave for 6 hours, together with a chromium sulfate solution containing 11.4 parts of chromium oxide ($Cr_2O_3$) and 22 parts of concentrated sulfuric acid. The dyestuff solution is filtered and concentrated somewhat and common salt is then added to precipitate the dyestuff. When dry the dyestuff is a dark powder soluble in water to a red-violet solution and in concentrated sulfuric acid to a dirty-red solution. It dyes wool in a sulfuric acid bath blue-violet shades.

Example 10

50.2 parts of the azo-dyestuff from diazotized 4-chloro-5-nitro-2-amino-1-hydroxybenzene and 1-aminonaphthalene-4:8-disulfonic acid are dissolved in 1000 parts of hot water and the solution is heated with a chromium chloride solution, corresponding with 11.4 parts of chromium oxide, for about 18 hours to boiling in a reflux apparatus. The dyestuff which precipitates on the addition of the chromium chloride solution dissolves completely during the boiling. A dyestuff containing chromium which has been formed crystallizes for the greater part when the solution is cooled; precipitation can be completed by the addition of about 100 parts of common salt. When dry the dyestuff is a powder having a metallic lustre; it is soluble in water to a blue solution and in concentrated sulfuric acid to a violet solution and dyes wool in a sulfuric acid bath blue shades.

A dyestuff which likewise dyes blue shades is obtained if chromium fluoride is used instead of chromium chloride and the heating is conducted under pressure.

Example 11

46.8 parts of the azo-dyestuff from diazotized 5-nitro-2-amino-1-hydroxybenzene and 1-aminonaphthalene-5:7-disulfonic acid of the formula

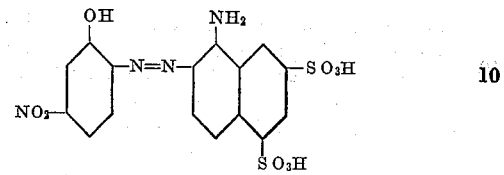

are dissolved in 1500 parts of hot water and the solution is heated for about 20 hours to boiling after addition of a quantity of chromium formate, corresponding with 11.4 parts of chromium oxide, and 55 parts of formic acid of 84 per cent. strength. The greater part of the formic acid is then neutralized by the addition of caustic soda solution and the dyestuff is isolated by evaporation of the solution. It is a dark powder which is soluble in water to a blue solution and in concentrated sulfuric acid to a green-blue solution. It dyes wool in a sulfuric acid bath blue shades.

What we claim is:

1. Process for the manufacture of chromiferous azo-dyestuffs, comprising heating azo-dyestuffs of the general formula

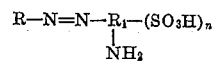

wherein R represents the radical of a diazo component containing groups capable of binding metal in complex union, $R_1$ represents a naphthalene nucleus and $n$ the number 1, 2 or 3, and wherein the $NH_2$-group of the naphthalene nucleus $R_1$ stands in 1- and in ortho-position to the azo-group, with a trivalent-chromium salt of an acid selected from the group consisting of hydrochloric, hydrofluoric and sulfuric acids until on the one hand the complex chromium compound of the azo-dyestuff has been formed, and, on the other hand, the $NH_2$-group of the naphthalene nucleus $R_1$ standing in 1- and in ortho-position to the azo-group has been exchanged for a hydroxyl group.

2. Process for the manufacture of chromiferous azo-dyestuffs, comprising heating azo-dyestuffs of the general formula

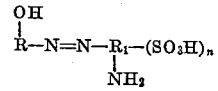

wherein R represents the radical of a diazo component the hydroxyl group of which stands in ortho-position to the azo-group, $R_1$ represents a naphthalene nucleus and $n$ the number 1, 2 or 3, and wherein the $NH_2$-group of the naphthalene nucleus $R_1$ stands in 1- and in ortho-position to the azo-group, with a trivalent-chromium salt of an acid selected from the group consisting of hydrochloric, hydrofluoric and sulfuric acids until on the one hand the complex chromium compound of the azo-dyestuff has been formed, and, on the other hand, the $NH_2$-group of the naphthalene nucleus $R_1$ standing in 1- and in ortho-position to the azo-group has been exchanged for a hydroxyl group.

3. Process for the manufacture of chromiferous azo-dyestuffs, comprising heating azo-dyestuffs of the general formula

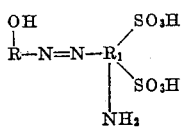

wherein R represents the radical of a diazo component the hydroxyl-group of which stands in ortho-position to the azo-group, $R_1$ represents a naphthalene nucleus, and wherein the $NH_2$-group of the naphthalene nucleus $R_1$ stands in 1- and in ortho-position to the azo-group, with a trivalent-chromium salt of an acid selected from the group consisting of hydrochloric, hydrofluoric and sulfuric acids until on the one hand the complex chromium compound of the azo-dyestuff has been formed, and, on the other hand, the $NH_2$-group of the naphthalene nucleus $R_1$ standing in 1- and in ortho-position to the azo-group has been exchanged for a hydroxyl group.

4. Process for the manufacture of chromiferous azo-dyestuffs, comprising heating azo-dyestuffs of the general formula

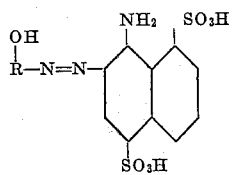

wherein R represents the radical of a diazo component the hydroxyl group of which stands in ortho-position to the azo-group, with a trivalent-chromium salt of an acid selected from the group consisting of hydrochloric, hydrofluoric and sulfuric acids until on the one hand the complex chromium compound of the azo-dyestuff has been formed, and, on the other hand, the $NH_2$-group of the naphthalene nucleus $R_1$ standing in ortho-position to the azo-group has been exchanged for a hydroxyl group.

5. Process for the manufacture of chromiferous azo-dyestuffs, comprising heating azo-dyestuffs of the general formula

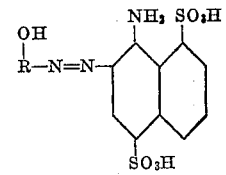

wherein R represents the radical of a diazo component the hydroxyl group of which stands in ortho-position to the azo-group, with chromium sulfate until on the one hand the complex chromium compound of the azo-dyestuff has been formed, and, on the other hand, the $NH_2$-group of the naphthalene nucleus $R_1$ standing in ortho-position to the azo-group has been exchanged for a hydroxyl group.

6. Process for the manufacture of chromiferous azo-dyestuffs, comprising heating the azo-dyestuff of the formula

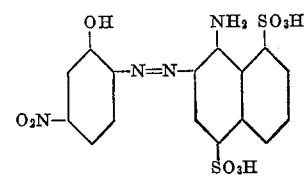

with chromium sulfate until on the one hand the complex chromium compound of the azo-dyestuff has been formed, and, on the other hand, the $NH_2$-group standing in ortho-position to the azo-group has been exchanged for a hydroxyl group.

WALTER HANHART.
PETER PIETH.